United States Patent
Mizutani

(10) Patent No.: US 8,619,123 B2
(45) Date of Patent: Dec. 31, 2013

(54) VIDEO PROCESSING APPARATUS AND METHOD FOR SCALING THREE-DIMENSIONAL VIDEO

(75) Inventor: Fumitoshi Mizutani, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 389 days.

(21) Appl. No.: 12/954,483

(22) Filed: Nov. 24, 2010

(65) Prior Publication Data

US 2011/0175979 A1    Jul. 21, 2011

(30) Foreign Application Priority Data

Jan. 20, 2010   (JP) .................................. 2010-010435

(51) Int. Cl.
*H04N 13/00* (2006.01)
(52) U.S. Cl.
USPC .......................................................... 348/43
(58) Field of Classification Search
USPC .......................................................... 348/43
See application file for complete search history.

(56) References Cited

U.S. PATENT DOCUMENTS

| | | | |
|---|---|---|---|
| 5,400,076 A | 3/1995 | Iwamura | |
| 5,767,898 A | 6/1998 | Urano et al. | |
| 7,265,791 B2 | 9/2007 | Song et al. | |
| 7,443,392 B2 | 10/2008 | Tsubaki | |
| 7,580,463 B2 | 8/2009 | Routhier et al. | |
| 7,693,221 B2 | 4/2010 | Routhier et al. | |
| 7,844,001 B2 | 11/2010 | Routhier et al. | |
| 8,384,766 B2 | 2/2013 | Routhier et al. | |
| 2002/0047835 A1 | 4/2002 | Kawai et al. | |
| 2006/0044388 A1 | 3/2006 | Kim et al. | |
| 2008/0303892 A1 | 12/2008 | Kim et al. | |
| 2009/0219382 A1 | 9/2009 | Routhier et al. | |
| 2010/0045782 A1* | 2/2010 | Morita | 348/51 |

(Continued)

FOREIGN PATENT DOCUMENTS

| | | |
|---|---|---|
| JP | 05-153573 A | 6/1993 |
| JP | 07-296185 A | 11/1995 |

(Continued)

OTHER PUBLICATIONS

First Office Action mailed by Japan Patent Office on Jan. 29, 2013 in the corresponding Japanese patent application No. 2011-127636 in 6 pages.

(Continued)

*Primary Examiner* — Richard Torrente
(74) *Attorney, Agent, or Firm* — Knobbe Martens Olson & Bear, LLP

(57) ABSTRACT

A video processing apparatus configured to scale three-dimensional video data including an interleaved image of a first resolution, in which a left-eye image and a right-eye image are alternately disposed in every other scanning line, to a second resolution, can include a left/right-eye image extraction module, an image interpolation module, and a scaling module. The left/right-eye image extraction module extracts a left-eye interleaved image corresponding to scanning lines of the left-eye image and a right-eye interleaved image corresponding to scanning lines of the right-eye image. The image interpolation module generates an interpolated left-eye image and an interpolated right-eye image by interpolating pixels by using the left-eye interleaved image and the right-eye interleaved image. The scaling module generates a left-eye scaling image and a right-eye scaling image by scaling the interpolated left-eye image and the interpolated right-eye image to the second resolution.

8 Claims, 10 Drawing Sheets

(56) References Cited

U.S. PATENT DOCUMENTS

| | | | |
|---|---|---|---|
| 2011/0164110 A1* | 7/2011 | Fortin et al. | 348/43 |
| 2011/0187821 A1 | 8/2011 | Routhier et al. | |
| 2011/0254921 A1 | 10/2011 | Pahalawatta et al. | |

FOREIGN PATENT DOCUMENTS

| | | |
|---|---|---|
| JP | 08-070475 A | 3/1996 |
| JP | 2001-95013 | 4/2001 |
| JP | 2002-092656 A | 3/2002 |
| JP | 2002-352271 A | 12/2002 |
| JP | 2004-215263 | 7/2004 |
| JP | 2004-215263 A | 7/2004 |
| JP | 2005-522958 A | 7/2005 |
| JP | 2006-067596 A | 3/2006 |
| JP | 2006-115246 A | 4/2006 |
| JP | 2006-186795 A | 7/2006 |
| JP | 2009-111442 A | 5/2009 |
| JP | 2009-253758 A | 10/2009 |
| JP | 2010-034704 A | 2/2010 |
| JP | 2010-049607 A | 3/2010 |
| JP | 2012-513728 A | 6/2012 |

OTHER PUBLICATIONS

First Office Action mailed by Japan Patent Office on Feb. 15, 2011 in the corresponding Japanese patent application No. 2010-010435 in 4 pages.

Office Action dated Oct. 1, 2013 in corresponding Japanese Patent Application 2011-127636—12 pages.

\* cited by examiner

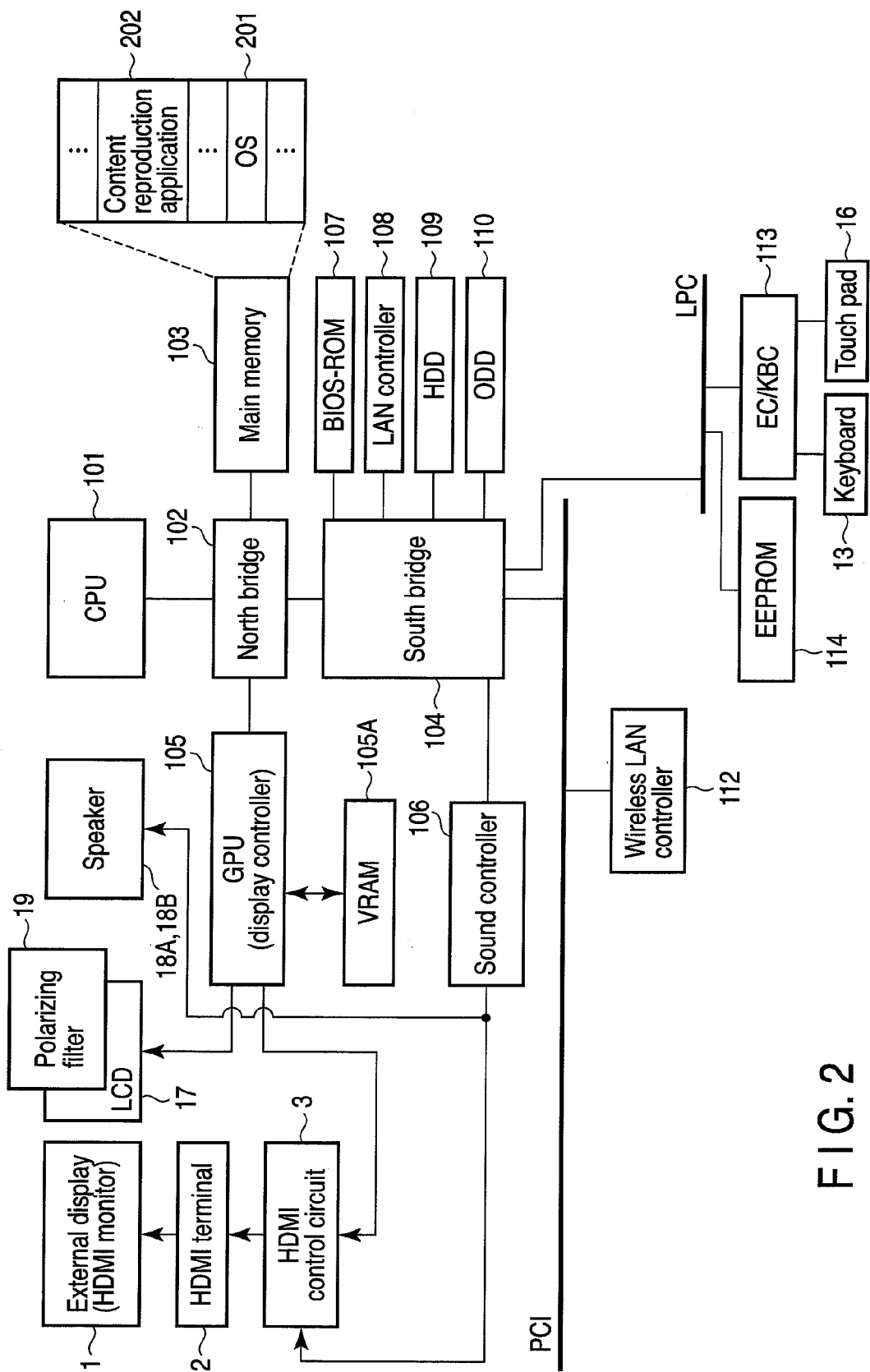
F I G. 2

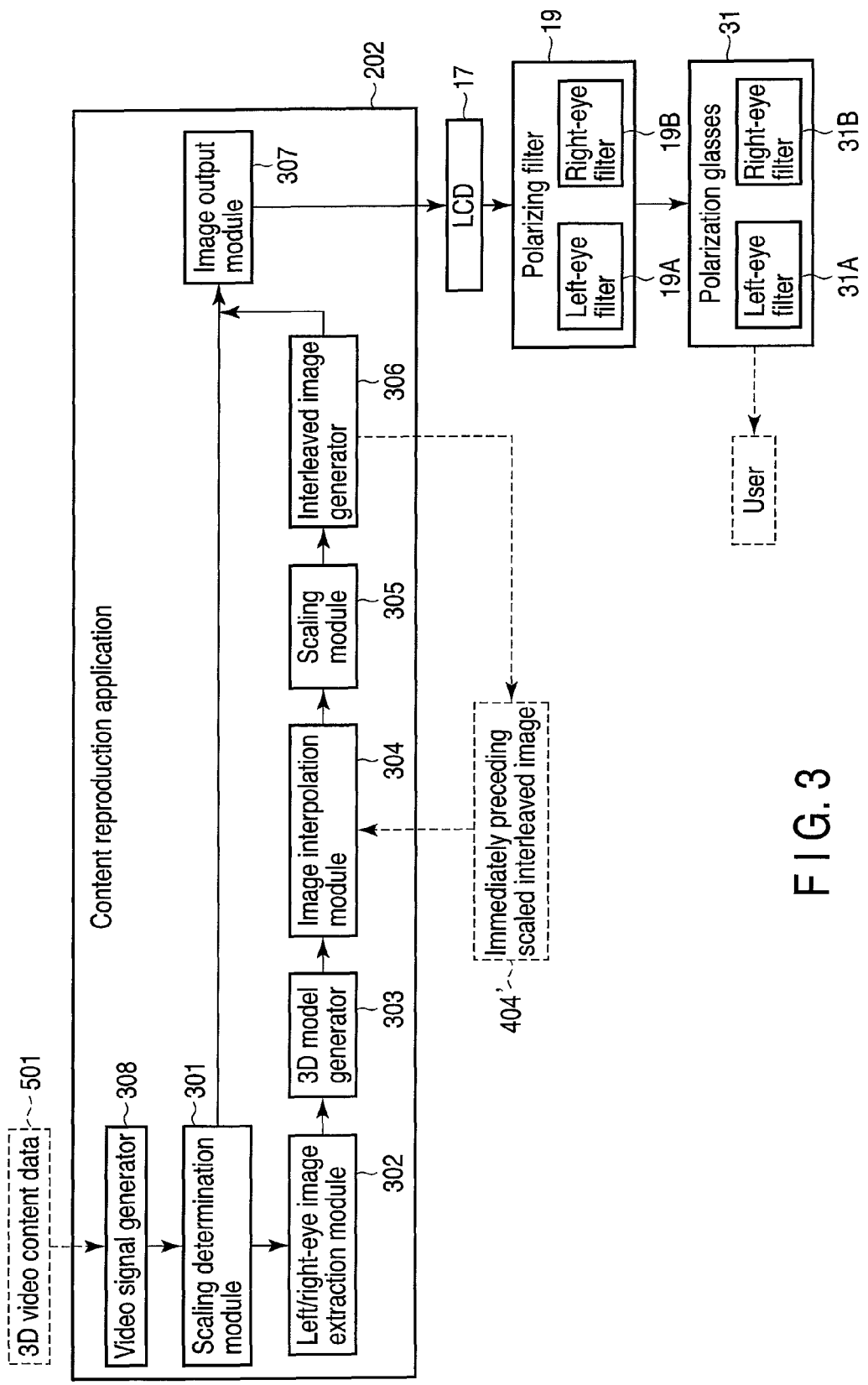
F I G. 3

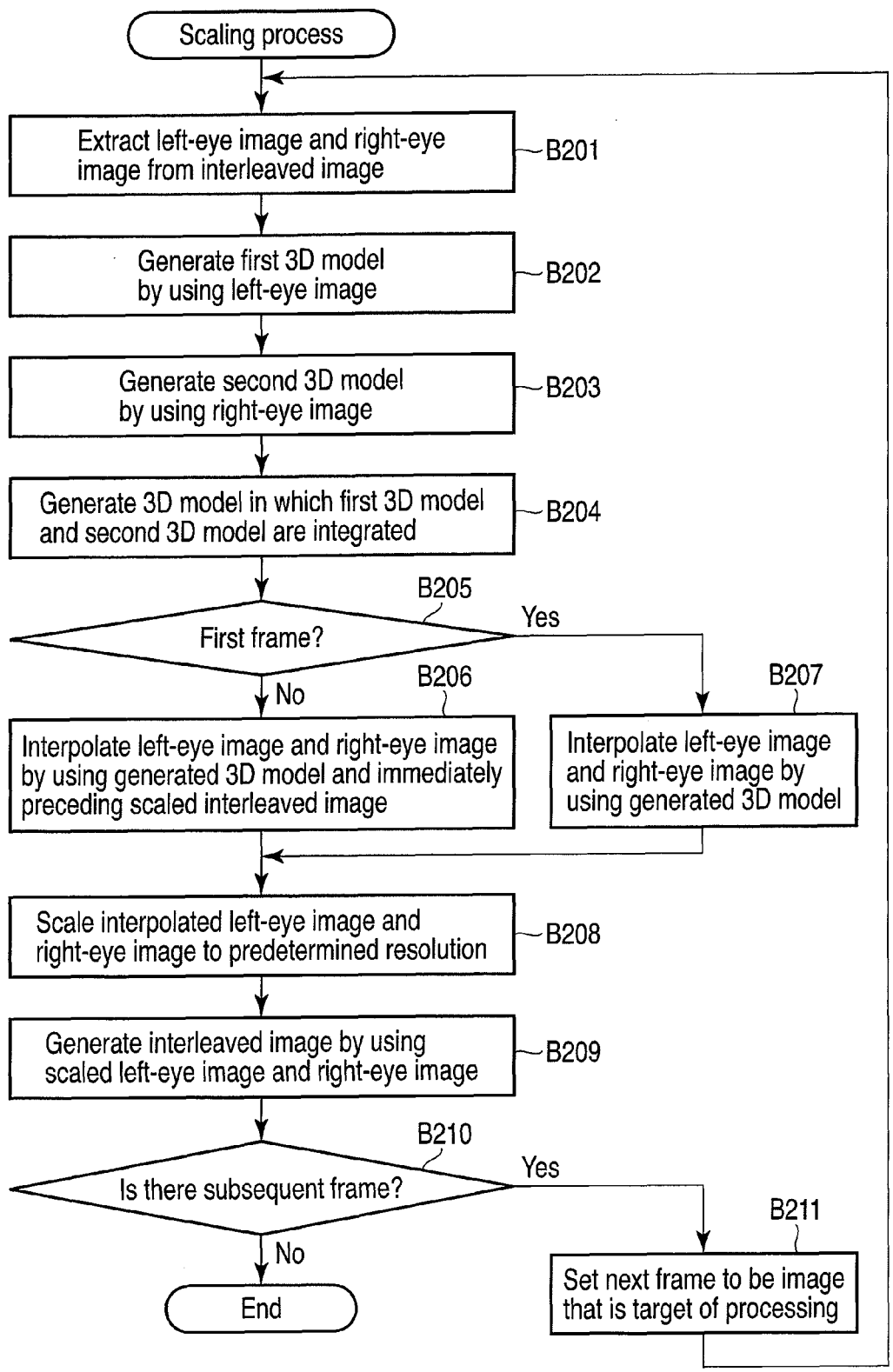
F I G. 10

VIDEO PROCESSING APPARATUS AND METHOD FOR SCALING THREE-DIMENSIONAL VIDEO

CROSS-REFERENCE TO RELATED APPLICATIONS

This application is based upon and claims the benefit of priority from Japanese Patent Application No. 2010-010435, filed Jan. 20, 2010; the entire contents of which are incorporated herein by reference.

FIELD

Embodiments described herein relate generally to a video processing apparatus and a video processing method of displaying three-dimensional (3D) video.

BACKGROUND

Conventionally, there are provided various video display apparatuses which enable viewing of 3D video. In such a video display apparatus, for example, a user is enabled to perceive 3D video (stereoscopic video) with use of left-eye video and right-eye video based on binocular parallax.

Jpn. Pat. Appln. KOKAI Publication No. 2004-215263 discloses a progressive scan conversion method for converting (IP conversion) an interlace-type image to a progressive-type image. In the technique of KOKAI Publication No. 2004-215263, when two-dimensional video content data is subjected to IP conversion, a progressive-type image is generated by interpolating pixels in an interlace-type image.

In the meantime, in a video display apparatus which enables viewing of 3D video by a polarization scheme, a left-eye image and a right-eye image are simultaneously displayed on the screen. The left-eye image and right-eye image are subjected to polarization in different directions through polarizing filters. The user can view the polarized left-eye image by the left eye and the polarized right-eye image by the right eye by using polarization glasses. Thereby, the user can perceive stereoscopic video by viewing the video displayed on the screen.

In the video display apparatus by the polarization scheme, the screen displays an image in which a left-eye image and a right-eye image are alternately disposed in every other scanning line, that is, an image in which a left-eye image and a right-eye image are interleaved. For example, the pixels of a left-eye image are displayed on odd-numbered scanning lines of the screen, and the pixels of a right-eye image are displayed on even-numbered scanning lines of the screen. Thus, a scanning line, in which no image is displayed, is present in every second scanning line in each of the left-eye image and right-eye image. It is possible, for example, that when the size of a window, in which 3D video is displayed, is enlarged, smoothly enlarged (scaled) 3D video cannot be generated. In other words, since information of video corresponding to a scanning line in the enlarged 3D video is lost due to the interleaving of the left-eye image and right-eye image, it is possible that smoothly enlarged 3D video cannot be generated.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 2 is an exemplary block diagram showing the system configuration of the video processing apparatus of the embodiment.

FIG. 3 is an exemplary block diagram showing the functional structure of a content reproduction application executed by the video processing apparatus of the embodiment.

FIG. 10 is an exemplary flowchart illustrating an example of the procedure of a scaling process executed by the content reproduction application of FIG. 3.

DETAILED DESCRIPTION

Various embodiments will be described hereinafter with reference to the accompanying drawings.

In general, according to one embodiment, a video processing apparatus configured which scales three-dimensional video data including an interleaved image of a first resolution, in which a left-eye image and a right-eye image are alternately disposed in every other scanning line, to a second resolution, the apparatus includes a left/right-eye image extraction module, an image interpolation module, and a scaling module. The left/right-eye image extraction module extracts a left-eye interleaved image corresponding to scanning lines of the left-eye image disposed in the interleaved image and a right-eye interleaved image corresponding to scanning lines of the right-eye image disposed in the interleaved image. The image interpolation module generates an interpolated left-eye image and an interpolated right-eye image by interpolating pixels missing due to the alternate disposition of the left-eye image and the right-eye image in every other scanning line, by using the left-eye interleaved image and the right-eye interleaved image. The scaling module generates a left-eye scaling image and a right-eye scaling image by scaling the interpolated left-eye image and the interpolated right-eye image to the second resolution.

Figure 1:
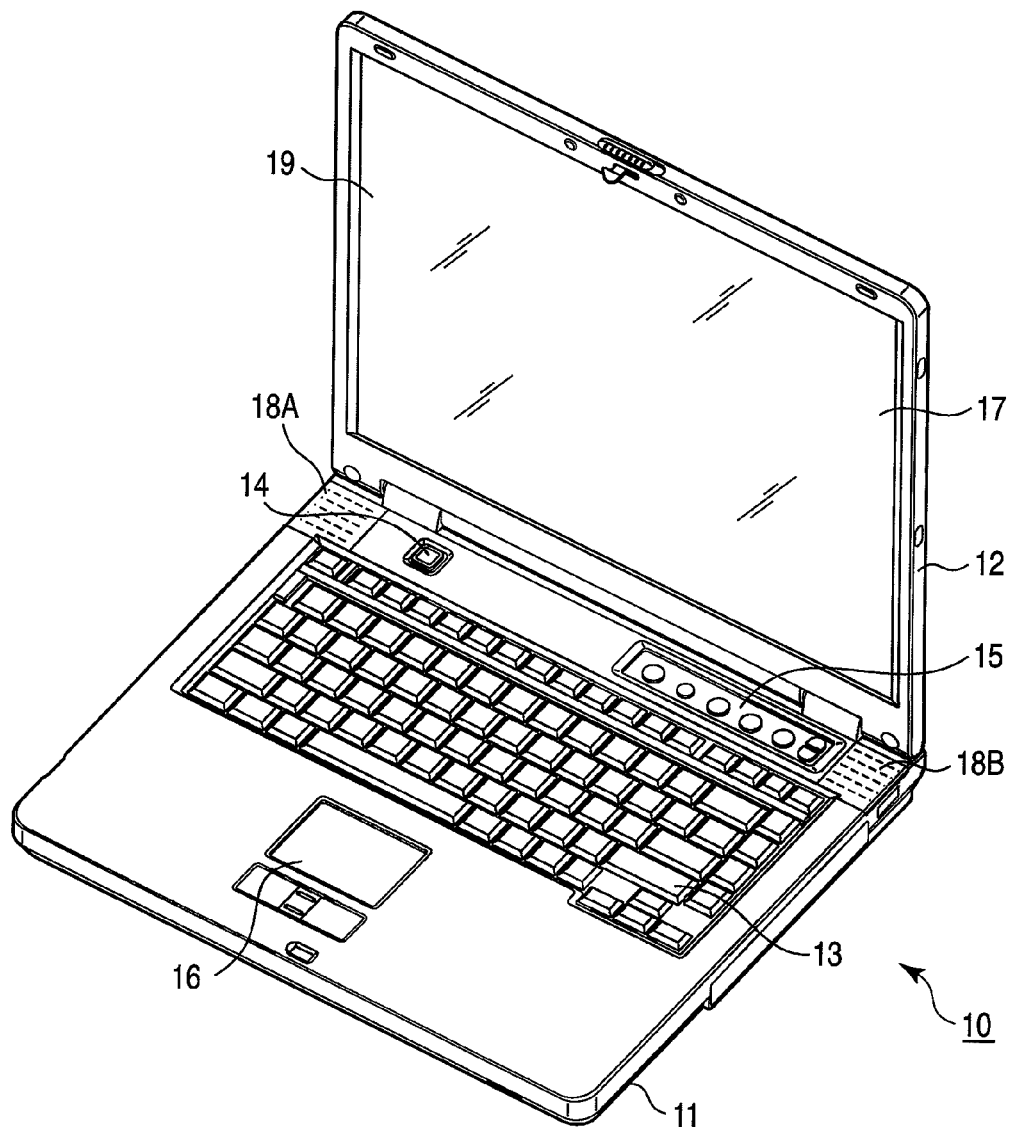
FIG. 1 is an exemplary perspective view showing the structure of a video processing apparatus according to an embodiment.

FIG. 1 is a perspective view showing the external appearance of a video display apparatus according to an embodiment. The video display apparatus is realized, for example, as a notebook-type personal computer 10. As shown in FIG. 1, the computer 10 includes a computer main body 11 and a display unit 12.

A liquid crystal display (LCD) 17 and a polarizing filter 19 are built in the display unit 12. The polarizing filter 19 is provided in a manner to cover the screen of the LCD 17. The display unit 12 is attached to the computer main body 11 such that the display unit 12 is rotatable between an open position where the top surface of the computer main body 11 is exposed, and a closed position where the top surface of the computer main body 11 is covered.

The computer main body 11 has a thin box-shaped housing. A keyboard 13, a power button 14 for powering on/off the computer 10, an input operation panel 15, a touch pad 16, and speakers 18A and 18B are disposed on the top surface of the housing of the computer main body 11. Various operation buttons are provided on the input operation panel 15.

An external display connection terminal (not shown) corresponding to, e.g. the high-definition multimedia interface (HDMI) standard is provided on the rear surface of the computer main body 11. The external display connection terminal is used for outputting a digital video signal to an external display.

FIG. 2 shows the system configuration of the computer 10.

The computer 10, as shown in FIG. 2, includes a CPU 101, a north bridge 102, a main memory 103, a south bridge 104, a GPU 105, a VRAM 105A, a sound controller 106, a BIOS-ROM 107, a LAN controller 108, a hard disk drive (HDD) 109, an optical disc drive (ODD) 110, a USB controller 111A, a card controller 111B, a wireless LAN controller 112, an embedded controller/keyboard controller (EC/KBC) 113, and an EEPROM 114.

The CPU 101 is a processor for controlling the operation of respective components in the computer 10. The CPU 101 executes an operating system (OS) 201 and various application programs, such as a content reproduction application program 202, which are loaded from the HDD 109 into the main memory 103. The content reproduction application program 202 is software for reproducing various digital contents stored in, e.g. the HDD 109. The content reproduction application program 202 also has a three-dimensional (3D) video reproduction function for reproducing 3D video content data. The 3D video reproduction function is, for example, a function of creating and displaying 3D video which can be viewed by, e.g. a polarization method such as an Xpol (trademark) system, or a time-division method. The 3D video is realized, for example, by causing a user to perceive left-eye video and right-eye video based on binocular parallax. The content data of 3D video is, for instance, 3D-capable video data contained in a DVD or video game. The video data is composed, for example, by interleaving data for left-eye video and data for right-eye video. Using this video data, the content reproduction application program 202 generates a video signal of a video image that is to be displayed on the LCD 17.

Besides, the CPU 101 executes a BIOS stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of communicating with the GPU 105 via, e.g. a PCI EXPRESS serial bus.

The GPU 105 is a display controller which controls the LCD 17 used as a display monitor of the computer 10. A display signal, which is generated by the GPU 105, is sent to the LCD 17. The LCD 17 displays video, based on the display signal.

The polarizing filter 19 is a filter for polarizing a video image displayed on the LCD 17. The polarizing filter 19 polarizes the left-eye video and right-eye video by being provided in a manner to cover the screen of the LCD 17. For example, the polarizing filter 19 outputs polarized video by polarizing odd-numbered scanning lines and even-numbered scanning lines from the top of the screen (LCD 17) in different directions. Specifically, the polarizing filter 19 is configured such that filters for polarization in different directions are alternately arranged in association with the odd-numbered scanning lines and even-numbered scanning lines.

In addition, the GPU 105 may send a digital video signal to an external display device 1 via an HDMI control circuit 3 and an HDMI terminal 2.

The HDMI terminal 2 is the above-described external display connection terminal. The HDMI terminal 2 is capable of sending a non-compressed digital video signal and a digital audio signal to the external display device 1, such as a TV, via a single cable. The HDMI control circuit 3 is an interface for sending a digital video signal to the external display device 1, which is called "HDMI monitor", via the HDMI terminal 2.

The south bridge 104 controls devices on a peripheral component interconnect (PCI) bus and devices on a low pin count (LPC) bus. The south bridge 104 includes an integrated drive electronics (IDE) controller for controlling the HDD 109 and ODD 110. The south bridge 104 also has a function of communicating with the sound controller 106.

The sound controller 106 is a sound source device and outputs audio data, which is a target of reproduction, to the speakers 18A and 18B or the HDMI control circuit 3. The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11g standard.

The EC/KBC 113 is a one-chip microcomputer in which an embedded controller for power management and a keyboard controller for controlling the keyboard 13 and touch pad 16 are integrated. The EC/KBC 113 has a function of powering on/off the computer 10 in accordance with the user's operation of the power button 14.

Next, referring to FIG. 3, a description is given of a functional structure of the content reproduction application program 202 which runs on the computer 10. The content reproduction application program 202 has a function of reproducing 3D video content data 501. The content reproduction application program 202 also has a scaling function for displaying on the LCD 17 a video signal, which is based on the 3D video content data 501, with an arbitrary resolution. The content reproduction application program 202 includes a scaling determination module 301, a left/right-eye image extraction module 302, a 3D model generator 303, an image interpolation module 304, a scaling module 305, an interleaved image generator 306, an image output module 307, and a video signal generator 308.

The video signal generator 308 generates a video signal including interleaved images by using the 3D video content data 501. The interleaved image is an image in which a left-eye image and a right-eye image, which are created in consideration of binocular parallax, are alternately disposed in every other scanning line. Accordingly, in the interleaved image, for example, the pixels of a left-eye image are displayed on odd-numbered scanning lines of the screen, and the pixels of a right-eye image are displayed on even-numbered scanning lines of the screen. In short, in the interleaved image, a left-eye image and a right-eye image are alternately arranged in every other row. In other words, in the interleaved image, for example, the pixels corresponding to the even-numbered scanning line of the left-eye image and the pixels corresponding to the odd-numbered scanning line of the right-eye image are missing. The video signal generator 308 outputs interleaved images included in the generated video signal to the scaling determination module 301.

The scaling determination module 301 determines whether it is necessary to scale the interleaved image output from the video signal generator 308. The scaling determination module 301 determines that the interleaved image needs to be scaled, for example, when the resolution of the interleaved image differs from the resolution of the window on the LCD 17 on which the interleaved image (3D video content data 501) is to be rendered. To be more specific, the scaling determination module 301 determines that the interleaved images need to be scaled ("up-scaling"), for example, when the size of the window, on which the 3D video content data 501 is reproduced and displayed, is changed to be enlarged.

When the scaling determination module 301 determines that the interleaved image needs to be scaled, that is, when the resolution of the interleaved image and the resolution of the window are different, the scaling determination module 301 outputs the interleaved image to the left/right-eye image extraction module 302. On the other hand, when the scaling determination module 301 determines that the interleaved image does not need to be scaled, that is, when the resolution of the interleaved image and the resolution of the window are equal, the scaling determination module 301 outputs the interleaved image to the image output module 307.

The left/right-eye image extraction module 302 extracts a left-eye interleaved image corresponding to the scanning lines of the left-eye image and a right-eye interleaved image corresponding to the scanning lines of the right-eye image, from the interleaved image output from the scaling determination module 301. The left/right-eye image extraction module 302 outputs the extracted left-eye interleaved image and right-eye interleaved image to the 3D model generator 303.

The 3D model generator 303 generates a 3D model by using the left-eye interleaved image and right-eye interleaved image, which are output from the left/right-eye image extraction module 302. Specifically, the 3D model generator 303 generates a first 3D model by estimating the depth of each of the pixels in the left-eye interleaved image. Similarly, the 3D model generator 303 generates a second 3D model by estimating the depth of each of the pixels in the right-eye interleaved image. Then, the 3D model generator 303 generates a 3D model in which the generated first 3D model and second 3D model are integrated in consideration of binocular parallax, etc. The 3D model generator 303 outputs the generated 3D model to the image interpolation module 304.

The image interpolation module 304 interpolates missing parts due to interleaving in the left-eye interleaved image and right-eye interleaved image by using the left-eye interleaved image and right-eye interleaved image. For example, taking binocular parallax into account, the image interpolation module 304 interpolates the left-eye interleaved image and right-eye interleaved image. Specifically, the image interpolation module 304 interpolates the missing part of the left-eye interleaved image by estimating the missing part with use of the right-eye interleaved image. In addition, the image interpolation module 304 interpolates the missing part of the right-eye interleaved image by estimating the missing part with use of the left-eye interleaved image. Thus, the image interpolation module 304 generates a left-eye image and a right-eye image in which their missing parts have been interpolated. As the binocular parallax that is taken into account at the time of interpolation, use may be made of a value (parameter) which is determined in advance, based on the eye separation distance, etc.

In the meantime, the image interpolation module 304 may interpolate the missing parts due to the interleaving in the left-eye interleaved image and right-eye interleaved image, by additionally using a 3D model which is output from the 3D model generator 303. Furthermore, the image interpolation module 304 may interpolate the missing parts due to the interleaving in the left-eye interleaved image and right-eye interleaved image, by additionally using and immediately preceding scaled interleaved image 404'. The immediately preceding scaled interleaved image 404' is a scaled interleaved image corresponding to an interleaved image which immediately precedes the present interleaved image (the target of processing) in the video signal (3D video content data 501) generated by the video signal generator 308. The image interpolation module 304 interpolates pixels which are missing due to alternate arrangement (interleave) of the left-eye image and right-eye image in every other scanning line, based on the 3D model. The image interpolation module 304 updates the pixel values of interpolated pixels by block-matching using the immediately preceding scaled interleaved image as a reference frame, and then generates an interpolated left-eye image and an interpolated right-eye image. By updating the pixel values of the interpolated pixels by using the immediately preceding scaled interleaved image, the interleaved image that is the target of processing can smoothly be scaled. The image interpolation module 304 outputs the interpolated left-eye image and interpolated right-eye image to the scaling module 305.

The 3D model used for the interpolation may be 3D data indicative of the 3D position of each pixel. Besides, the image interpolation module 304 may interpolate the left-eye interleaved image and right-eye interleaved image by using the 3D model alone.

The scaling module 305 generates a left-eye scaling image and a right-eye scaling image by scaling the interpolated left-eye image and interpolated right-eye image from a first resolution to a second resolution. Specifically, the scaling module 305 converts the interpolated left-eye image and interpolated right-eye image to a left-eye scaling image and a right-eye scaling image at a second resolution which is higher than a first resolution of each of the interpolated left-eye image and interpolated right-eye image. The second resolution, for example, is a resolution corresponding to the size of the window for reproducing the 3D video content data 501. Accordingly, the second resolution is also varied, for example, by an operation in which the size of the window is varied. The scaling module 305 outputs the left-eye scaling image and right-eye scaling image to the interleaved image generator 306.

The interleaved image generator 306 generates an interleaved image by alternately arranging the left-eye scaling image and right-eye scaling image input by the scaling module 305 in every other scanning line. For example, the interleaved image generator 306 disposes the pixels, which correspond to odd-numbered scanning lines in the left-eye scaling image, in odd-numbered scanning lines in the interleaved image, and disposes the pixels, which correspond to even-numbered scanning lines in the right-eye scaling image, in even-numbered scanning lines in the interleaved image. Thereby, an interleaved image, in which the interleaved image included in the 3D video content data 501 is smoothly scaled from the first resolution to the second resolution, is generated. The interleaved image generator 306 outputs the generated interleaved image to the image output module 307. In addition, the interleaved image generator 306 stores the generated interleaved image as the immediately preceding scaled interleaved image 404'.

The image output module 307 outputs to the LCD 17 the interleaved image output from the scaling determination module 301, or the scaled interleaved image output from the interleaved image generator 306.

The LCD 17 displays the input interleaved image on the screen.

The polarizing filter 19 polarizes the interleaved image displayed on the LCD 17. For example, the polarizing filter 19 polarizes, in a first direction, the image (left-eye image) which corresponds to the odd-numbered scanning lines, and polarizes, in a second direction, the image (right-eye image) which corresponds to the even-numbered scanning lines. Thus, the polarizing filter 19 includes a left-eye filter 19A at a position corresponding to the odd-numbered scanning lines, and a right-eye filter 19B at a position corresponding to the even-numbered scanning lines. The left-eye filter 19A and right-eye filter 19B polarize the images in different directions. Specifically, the left-eye filter 19A polarizes the left-eye image in the first direction and the right-eye filter 19B polarizes the right-eye image in the second direction.

The polarization glasses 31 extract necessary images by filtering the polarized images. The polarization glasses 31 include a left-eye filter 31A and a right-eye filter 31B. The left-eye filter 31A passes only the polarized left-eye image. On the other hand, the right-eye filter 31B passes only the polarized right-eye image. The user wears the polarization glasses 31 and views the polarized images, thus being able to perceive the left-eye image by the left eye and the right-eye image by the right eye. In other words, by wearing the polarization glasses 31 and viewing the polarized images, the user can view 3D video.

By the above-described structure, when the resolution (first resolution) of a video signal based on the input 3D video content data 501 is different from the size (second resolution) of the window on which the video signal is to be displayed, the content reproduction application program 202 can smoothly scale the video signal in accordance with the size of the window. The video signal based on the 3D video content data 501 includes an interleaved image in which a left-eye image and a right-eye image are alternately disposed in every other scanning line. The content reproduction application program 202 interpolates a missing part due to interleaving in each of the left-eye image and right-eye image which are disposed in the interleaved image, and scales the interpolated image from the first resolution to the second resolution, thus being able to smoothly scale the interleaved image.

In the meantime, the image output module 307 may output the left-eye scaling image and right-eye scaling image, which are output from the scaling module 305, to the LCD 17. The left-eye scaling image and right-eye scaling image are, as described above, generated by interpolating the missing pixels due to the interleaving in the left-eye interleaved image and right-eye interleaved image disposed in the interleaved image, and scaling the interpolated images from the first resolution to the second resolution. The image output module 307 outputs the left-eye scaling image and right-eye scaling image alternately (at high speed) to the LCD 17. For example, by using liquid crystal shutter glasses (not shown), the user can view the left-eye scaling image by the left eye and the right-eye scaling image by the right eye. To be more specific, the user can view the left-eye scaling image by the left eye and the right-eye scaling image by the right eye, by using the liquid crystal shutter glasses having the function of passing an image to the left eye alone when the left-eye scaling image is displayed on the LCD 17 and passing an image to the right eye alone when the right-eye scaling image is displayed on the LCD 17. In other words, the content reproduction application 202 displays the left-eye scaling image and right-eye scaling image alternately (at high speed) on the LCD 17, and the shutter in front of the user's left eye and the shutter in front of the user's right eye are opened/closed in synchronization with the display of images, and thereby the user can perceive the video displayed on the screen as stereoscopic video.

Figure 4:
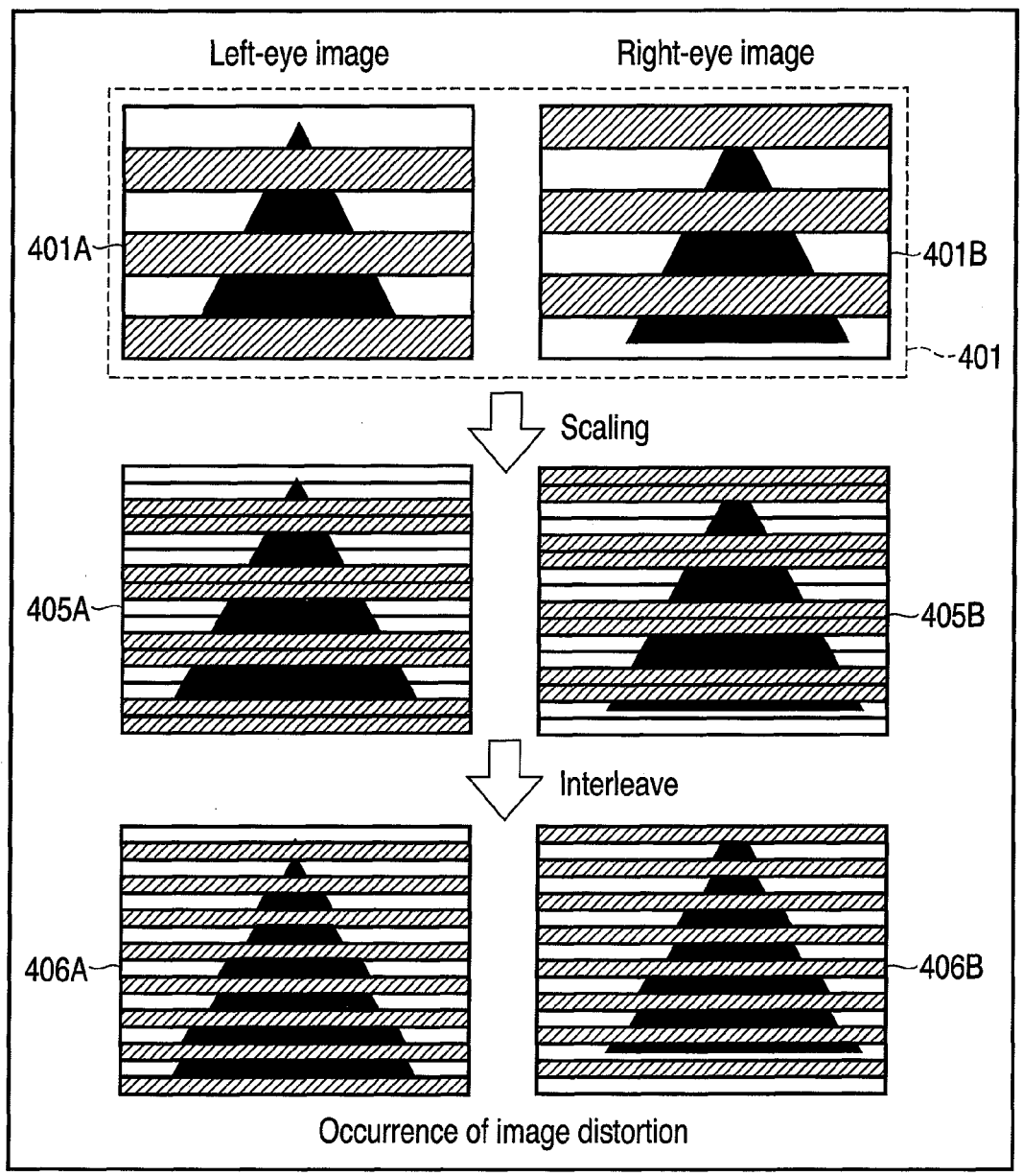
FIG. 4 is an exemplary conceptual view showing an example in which an image distortion occurs due to scaling of an interleaved image.

FIG. 4 shows an example in which an image distortion occurs due to scaling of an interleaved image 401. In FIG. 4, a left-eye image and a right-eye image are alternately disposed in every other scanning line in the interleaved image 401. In the interleaved image 401, for example, the left-eye image is disposed in odd-numbered scanning lines, and the right-eye image is disposed in even-numbered scanning lines. Accordingly, the interleaved image 401 includes an interleaved left-eye image (left-eye interleaved image) 401A and an interleaved right-eye image (right-eye interleaved image) 401B. In the left-eye interleaved image 401A, for example, scanning lines in which an image is rendered are disposed at odd-numbered scanning lines, and scanning lines (hatched parts in FIG. 4) in which no image is rendered are disposed at even-numbered scanning lines. In other words, in the left-eye interleaved image 401A, an image corresponding to the even-numbered scanning lines is missing. In the right-eye interleaved image 401B, for example, scanning lines in which no image is rendered are disposed at odd-numbered scanning lines, and scanning lines in which an image is rendered are disposed at even-numbered scanning lines. In other words, in the right-eye interleaved image 401B, an image corresponding to the odd-numbered scanning lines is missing.

When the left-eye interleaved image 401A and right-eye interleaved image 401B are scaled, a scaled left-eye interleaved image 405A and a scaled right-eye interleaved image 405B are generated. For example, the scaled left-eye interleaved image 405A and scaled right-eye interleaved image 405B, in which the numbers of scanning lines in the left-eye interleaved image 401A and right-eye interleaved image 401B are doubled, are generated.

Subsequently, when the scaled left-eye interleaved image 405A and scaled right-eye interleaved image 405B are interleaved once again, a left-eye interleaved image 406A and a right-eye interleaved image 406B, in which scanning lines in which an image is rendered and scanning lines in which no image is rendered are alternately disposed, are generated. In the scaled left-eye interleaved image 405A, neighboring scanning lines, for example, an even-numbered scanning line (e.g. the second scanning line from the top), in which an image is rendered, and an odd-numbered scanning line (e.g. the third scanning line from the top), in which no image is rendered, are transposed, and thereby the left-eye interleaved image 406A is generated. In the scaled right-eye interleaved image 405B, neighboring scanning lines, for example, an even-numbered scanning line (e.g. the second scanning line from the top), in which no image is rendered, and an odd-numbered scanning line (e.g. the third scanning line from the top), in which an image is rendered, are transposed, and thereby the right-eye interleaved image 406B is generated.

If the interleaved image 401 is subjected to the above-described scaling and re-interleaving, since the scanning lines are disposed at positions different from the proper positions, it is possible that an image distortion occurs in images, as in the interleaved images 406A and 406B (e.g. objects rendered in the images). In the present embodiment, as in an example shown in FIG. 5, the interleaved image 401 is smoothly scaled.

Figure 5:
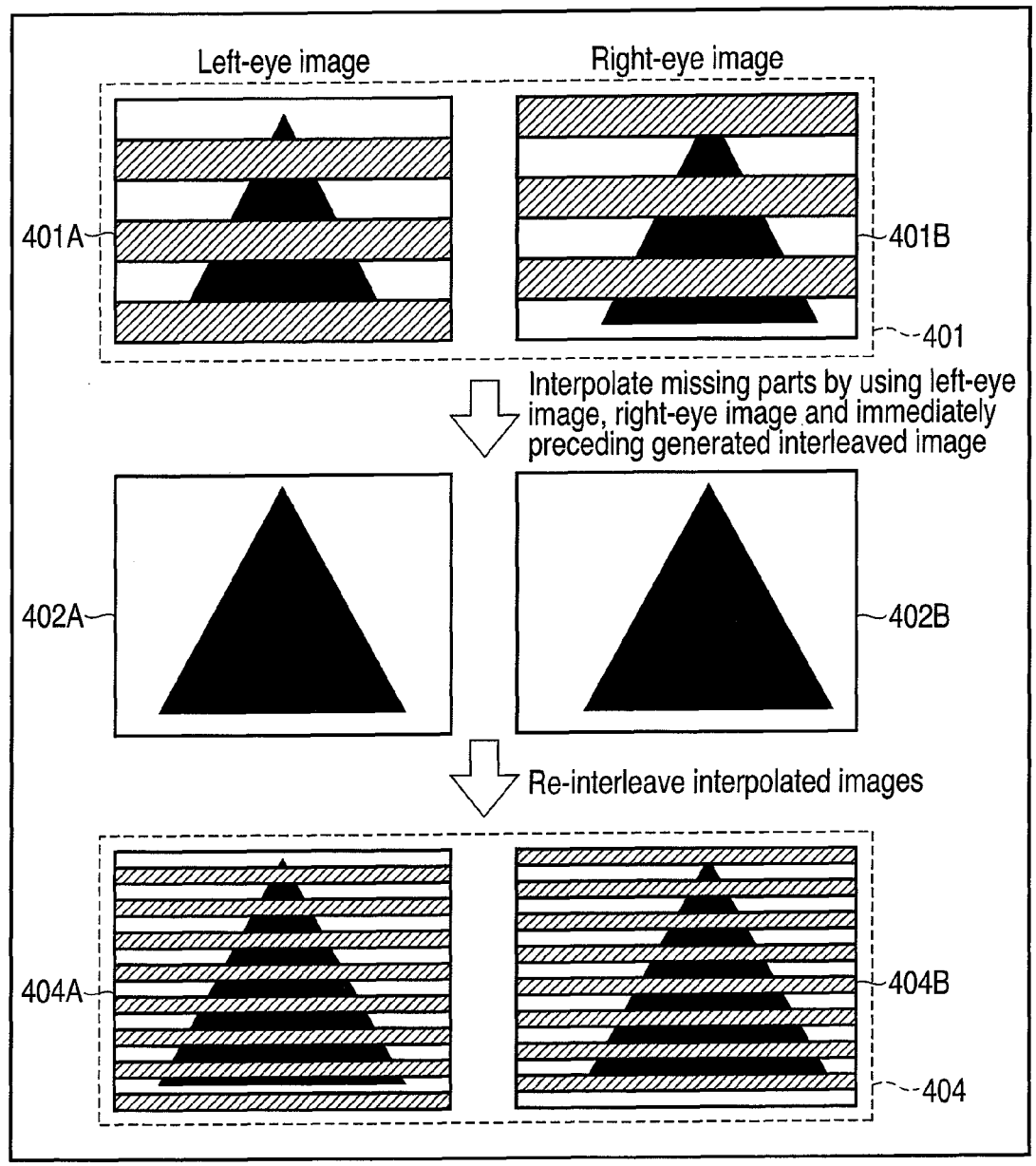
FIG. 5 is an exemplary conceptual view showing an example in which an interleaved image is smoothly scaled by the content reproduction application shown in FIG. 3.

In FIG. 5, like FIG. 4, a left-eye image 407A and a right-eye image 407B are alternately disposed in every other scanning line in the interleaved image 401. In the interleaved image 401, for example, the left-eye image 407A is disposed in odd-numbered scanning lines, and the right-eye image 407B is disposed in even-numbered scanning lines. Accordingly, the interleaved image 401 includes an interleaved left-eye image (left-eye interleaved image) 401A and an interleaved right-eye image (right-eye interleaved image) 401B. In the left-eye interleaved image 401A, for example, scanning lines in which an image is rendered are disposed at odd-numbered scanning lines, and scanning lines (hatched parts in FIG. 5) in which no image is rendered are disposed at even-numbered scanning lines. In other words, in the left-eye interleaved image 401A, an image corresponding to the even-numbered scanning lines is missing. In the right-eye interleaved image 401B, for example, scanning lines in which no image is rendered are disposed at odd-numbered scanning lines, and scanning lines in which an image is rendered are disposed at even-numbered scanning lines. In other words, in the right-eye interleaved image 401B, an image corresponding to the odd-numbered scanning lines is missing.

The content reproduction application 202 interpolates missing parts due to interleaving in the left-eye interleaved image 401A and right-eye interleaved image 401B, by using the left-eye interleaved image 401A and right-eye interleaved image 401B. The content reproduction application 202 interpolates the left-eye interleaved image 401A and right-eye interleaved image 401B, for example, by taking binocular parallax into account. Specifically, the content reproduction application 202 interpolates the missing parts in the left-eye interleaved image 401A, that is, the pixels corresponding to the even-numbered scanning lines based on the right-eye interleaved image 401B by taking binocular parallax into account. In addition, the content reproduction application 202 interpolates the missing parts in the right-eye interleaved image 401B, that is, the pixels corresponding to the odd-numbered scanning lines based on the left-eye interleaved image 401A by taking binocular parallax into account. Thereby, the content reproduction application 202 generates a left-eye image 402A and a right-eye image 402B, in which the missing parts in the left-eye interleaved image 401A and right-eye interleaved image 401B are interpolated.

In the meantime, the content reproduction application 202 may interpolate the missing parts in the left-eye interleaved image 401A and right-eye interleaved image 401B, by using a 3D model which is estimated from the left-eye interleaved image 401A and right-eye interleaved image 401B. Furthermore, the content reproduction application 202 may interpolate the missing parts in the left-eye interleaved image 401A and right-eye interleaved image 401B, by additionally using the immediately preceding scaled interleaved image 404'.

Subsequently, the content reproduction application 202 generates a scaled left-eye interleaved image 404A and a scaled right-eye interleaved image 404B by scaling and re-interleaving the interpolated left-eye image 402A and interpolated right-eye image 402B. The content reproduction application 202 disposes, for example, the pixels, which correspond to the odd-numbered scanning lines of the interpolated left-eye image 402A, in the odd-numbered scanning lines of the left-eye interleaved image 404A, and disposes the pixels, in which no image is rendered, in the even-numbered scanning lines of the left-eye interleaved image 404A. In addition, the content reproduction application 202 disposes, for example, the pixels, which correspond to the even-numbered scanning lines of the interpolated right-eye image 402B, in the even-numbered scanning lines of the right-eye interleaved image 404B, and disposes the pixels, in which no image is rendered, in the odd-numbered scanning lines of the right-eye interleaved image 404B. As described above, after the left-eye interleaved image 401A and right-eye interleaved image 401B are interpolated, the resultant images are subjected to the scaling and re-interleaving, and thereby the interleaved image 401 can smoothly be scaled. The LCD 17 displays an interleaved image 404 in which the left-eye interleaved image 404A and right-eye interleaved image 404B are integrated. In other words, the content reproduction application 202 displays on the LCD 17 the interleaved image 404 in which, for example, the odd-numbered scanning lines of the left-eye interleaved image 404A and the even-numbered scanning lines of the right-eye interleaved image 404B are alternately disposed.

In the meantime, the content reproduction application 202 may display an image for a time-division method on the LCD 17. In this case, the content reproduction application 202 scales the interpolated left-eye image 402A and right-eye image 402B from the first resolution to the second resolution. Then, the content reproduction application 202 alternately displays the scaled left-eye image 402A and right-eye image 402B on the LCD 17. For example, by using liquid crystal shutter glasses, the user can view the left-eye image by the left eye and the right-eye image by the right eye. To be more specific, the user can view the left-eye image by the left eye and the right-eye image by the right eye, by using the liquid crystal shutter glasses having the function of passing an image to the left eye alone when the left-eye image is displayed on the LCD 17 and passing an image to the right eye alone when the right-eye image is displayed on the LCD 17. In other words, the content reproduction application 202 displays the left-eye image and right-eye image alternately (at high speed) on the LCD 17, and the shutter in front of the user's left eye and the shutter in front of the user's right eye are opened/closed in synchronized with the display of images, and thereby the user can perceive the video displayed on the screen as stereoscopic video.

Figure 6:
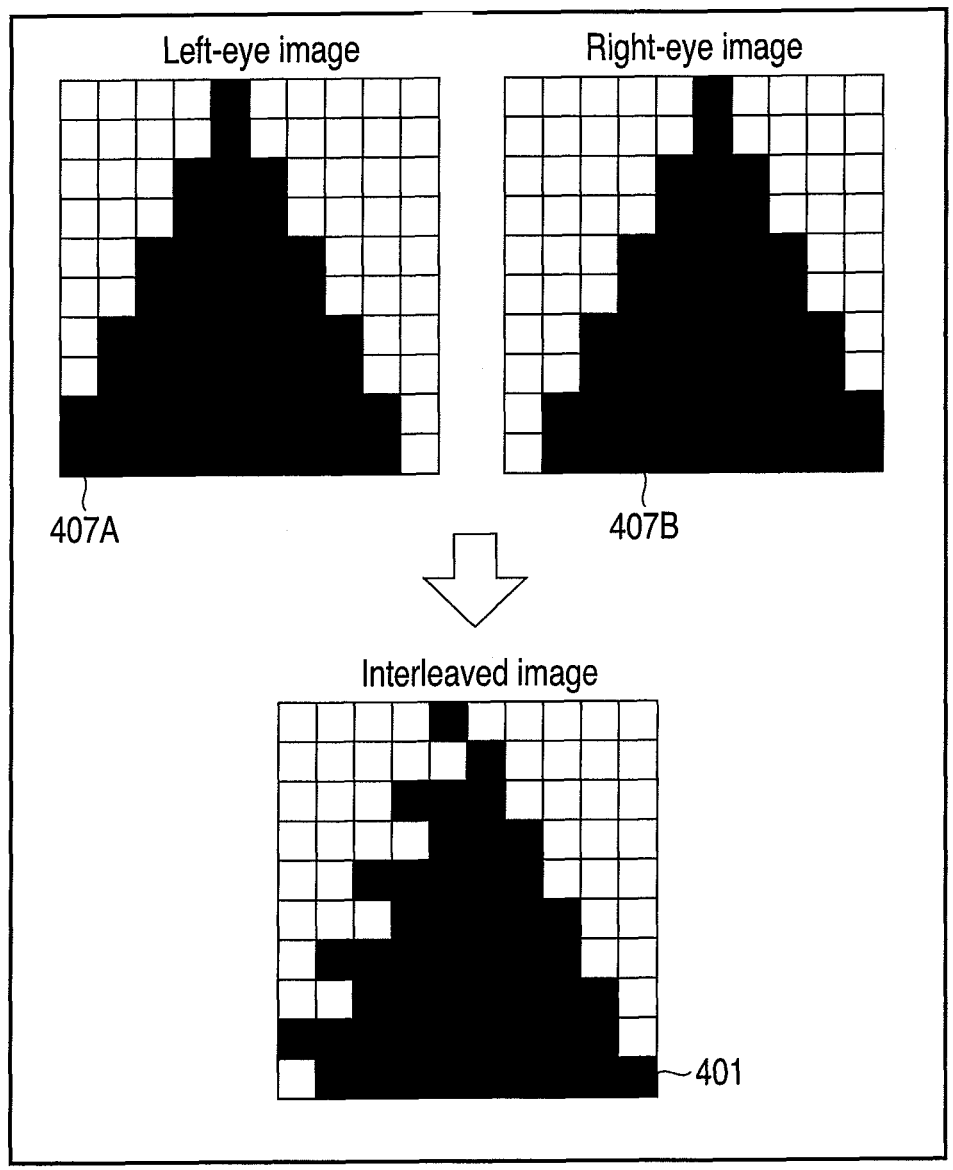
FIG. 6 is an exemplary conceptual view showing an example of an interleaved image input to the content reproduction application shown in FIG. 3.
Figure 7:
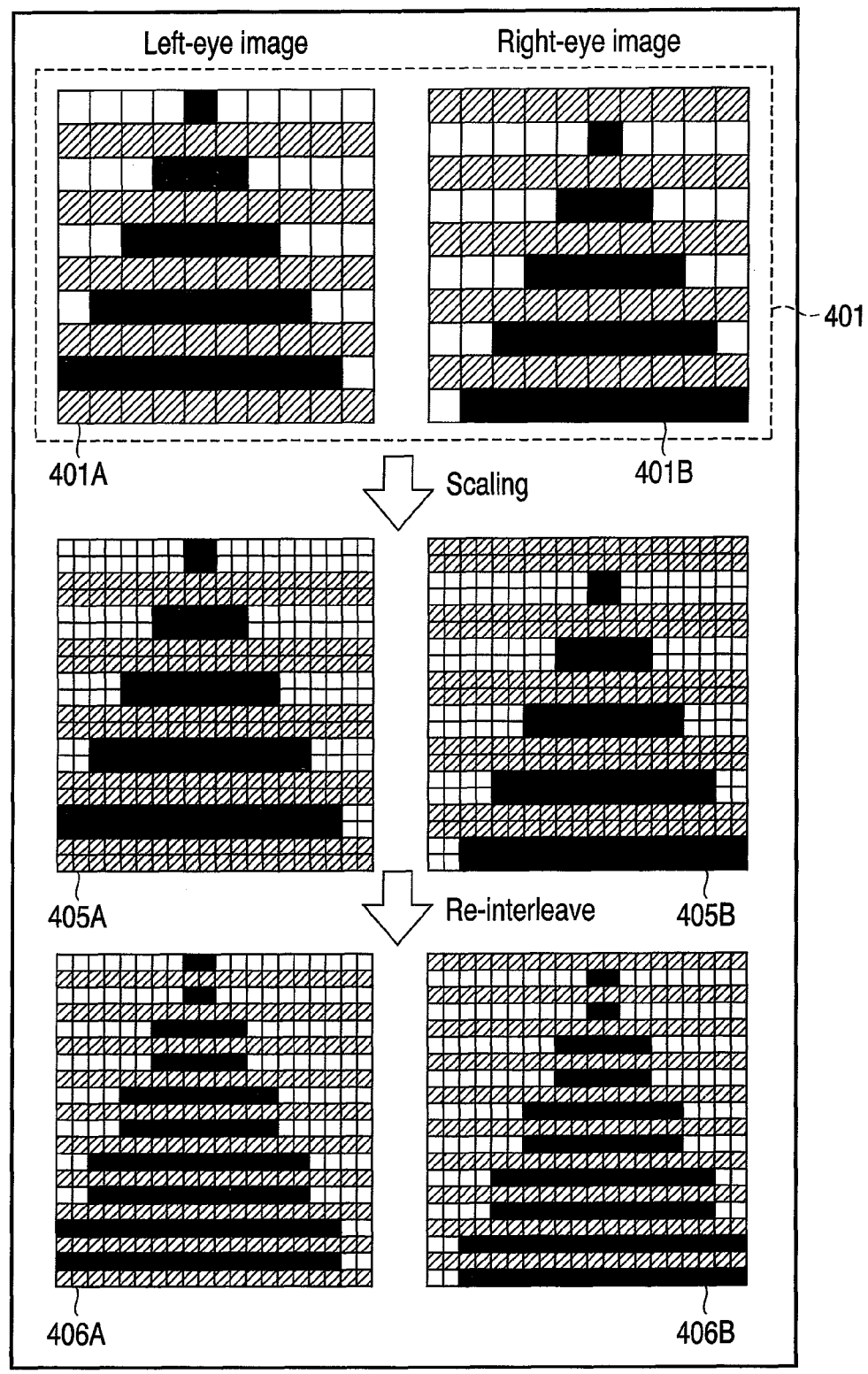
FIG. 7 is an exemplary conceptual view showing an example in which an image distortion occurs due to scaling of the interleaved image of FIG. 6.
Figure 8:
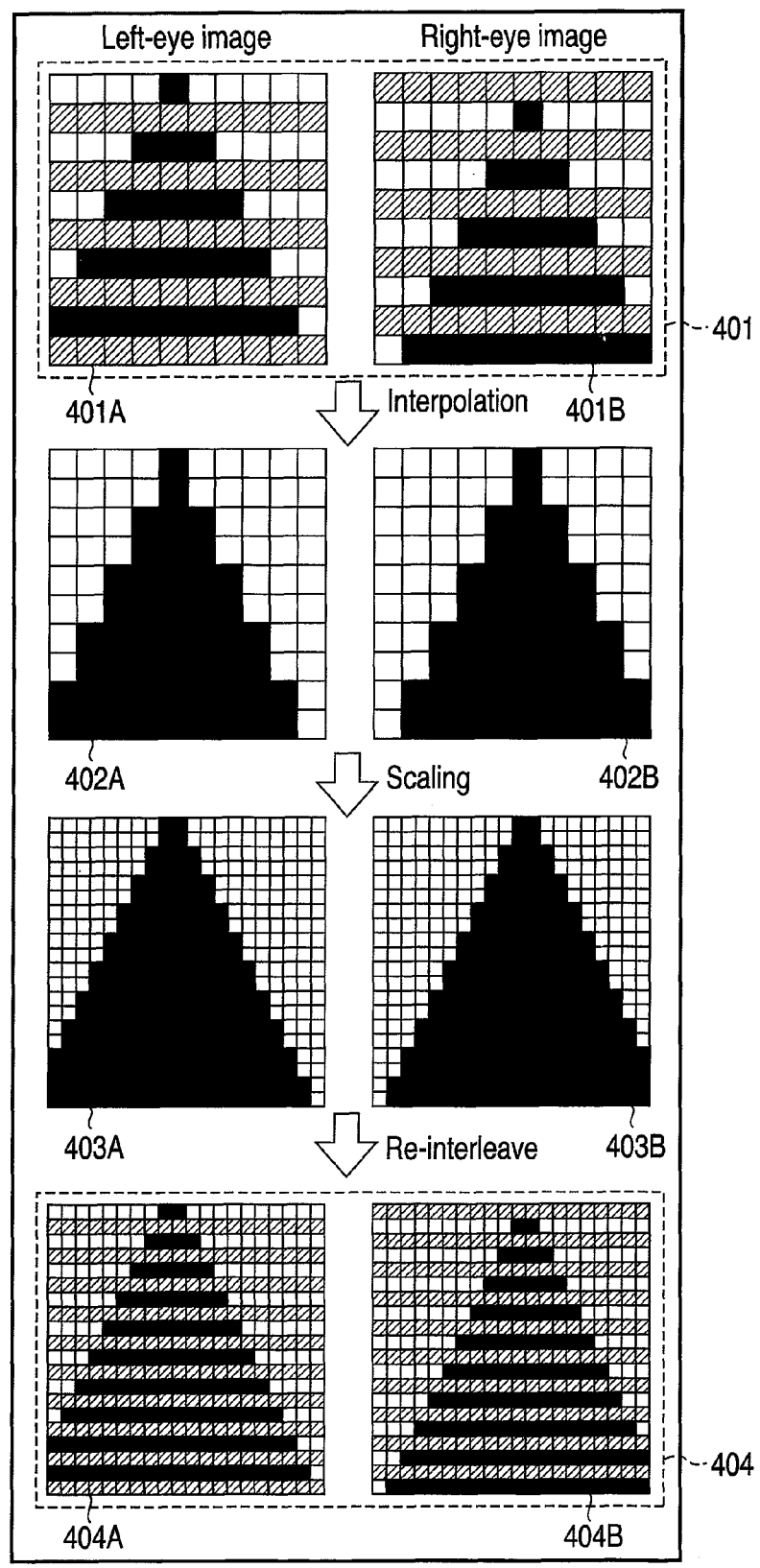
FIG. 8 is an exemplary conceptual view showing an example in which the interleaved image of FIG. 6 is smoothly scaled by the content reproduction application of FIG. 3.

Next, referring to FIG. 6 to FIG. 8, a description is given of detailed examples of scaling of the interleaved image 401.

FIG. 6 shows an example in which an interleaved image 401, which is input to the content reproduction application 202, is created. The interleaved image 401 is created by alternately disposing a left-eye image 407A and a right-eye image 407B in every other scanning line. The left-eye image 407A and the right-eye image 407B are created by taking binocular parallax into account. In the interleaved image 401 shown in FIG. 6, in the odd-numbered scanning lines the associated scanning lines in the left-eye image 407A are disposed, and in the even-numbered scanning lines associated scanning lines in the right-eye image 407B are disposed. Accordingly, in the interleaved image 401, for example, the pixels corresponding to the even-numbered scanning lines of the left-eye image 407A and the pixels corresponding to the odd-numbered scanning lines of the right-eye image 407B are missing. The created interleaved image 401 is displayed on the LCD 17 which is covered with the polarizing filter 19, and is viewed with use of the polarization glasses 31. Thereby, the user can perceive 3D video.

FIG. 7 shows an example in which an image distortion occurs due to scaling of the interleaved image 401. As described above, the interleaved image 401 includes a left-eye interleaved image 401A and a right-eye interleaved image 401B. Areas indicated by hatching in FIG. 7 designate areas in which an image is missing due to interleaving. In the left-eye interleaved image 401A, odd-numbered scanning lines, in which an image is displayed, and even-numbered scanning lines, in which no image is displayed (an image is missing), are alternately disposed. In addition, in the right-eye interleaved image 401B, odd-numbered scanning lines, in which no image is displayed (an image is missing), and even-numbered scanning lines, in which an image is displayed, are alternately disposed.

When the left-eye interleaved image 401A and right-eye interleaved image 401B are scaled, a scaled left-eye interleaved image 405A and a scaled right-eye interleaved image 405B are generated. For example, the scaled left-eye interleaved image 405A and scaled right-eye interleaved image 405B, in which the numbers of pixels in the horizontal and vertical directions in the left-eye interleaved image 401A and right-eye interleaved image 401B are doubled, are generated. In other words, the left-eye interleaved image 405A and right-eye interleaved image 405B, in which the numbers of scanning lines in the left-eye interleaved image 401A and right-eye interleaved image 401B are doubled, are generated.

Subsequently, when the scaled left-eye interleaved image 405A and scaled right-eye interleaved image 405B are interleaved once again, a left-eye interleaved image 406A and a right-eye interleaved image 406B, in which scanning lines in which an image is rendered and scanning lines in which no image is rendered are alternately disposed, are generated. The left-eye interleaved image 406A is generated by transposing neighboring scanning lines, for example, an even-numbered scanning line (e.g. the second scanning line from the top), in which an image is rendered, and an odd-numbered scanning line (e.g. the third scanning line from the top), in which no image is rendered, in the scaled left-eye interleaved image 405A. The right-eye interleaved image 406B is generated by transposing neighboring scanning lines, for example, an even-numbered scanning line (e.g. the second scanning line from the top), in which no image is rendered, and an odd-numbered scanning line (e.g. the third scanning line from the top), in which an image is rendered, in the scaled right-eye interleaved image 405B.

If the interleaved image 401 is subjected to the above-described scaling and re-interleaving, since the scanning lines are disposed at positions different from the proper positions, it is possible that an image distortion occurs in images, as in the interleaved images 406A and 406B (e.g. objects rendered in the images).

FIG. 8 shows an example in which the interleaved image 401 shown in FIG. 6 is smoothly scaled by the content reproduction application 202. As in the case of FIG. 7, the interleaved image 401 includes a left-eye interleaved image 401A and a right-eye interleaved image 401B. Areas indicated by hatching in FIG. 8 designate areas in which an image is missing due to interleaving. In the left-eye interleaved image 401A in FIG. 8, odd-numbered scanning lines, in which an image is displayed, and even-numbered scanning lines, in which no image is displayed (an image is missing), are alternately disposed. In addition, in the right-eye interleaved image 401B in FIG. 8, odd-numbered scanning lines, in which no image is displayed (an image is missing), and even-numbered scanning lines, in which an image is displayed, are alternately disposed.

Using the left-eye interleaved image 401A and right-eye interleaved image 401B, the missing parts (hatched parts in FIG. 8) due to interleaving in the left-eye interleaved image 401A and right-eye interleaved image 401B are interpolated. The content reproduction application 202 interpolates the left-eye interleaved image 401A and right-eye interleaved image 401B, for example, by taking binocular parallax into account. Specifically, the content reproduction application 202 interpolates the missing parts in the left-eye interleaved image 401A, that is, the pixels corresponding to the even-numbered scanning lines, based on the right-eye interleaved image 401B by taking binocular parallax into account. In addition, the content reproduction application 202 interpolates the missing parts in the right-eye interleaved image 401B, that is, the pixels corresponding to the odd-numbered scanning lines, based on the left-eye interleaved image 401A by taking binocular parallax into account. Thereby, the content reproduction application 202 generates a left-eye image 402A and a right-eye image 402B, in which the missing parts in the left-eye interleaved image 401A and right-eye interleaved image 401B are interpolated.

In the meantime, the content reproduction application 202 may interpolate the missing parts in the left-eye interleaved image 401A and right-eye interleaved image 401B, by using a 3D model which is estimated from the left-eye interleaved image 401A and right-eye interleaved image 401B. Furthermore, the content reproduction application 202 may interpolate the missing parts in the left-eye interleaved image 401A and right-eye interleaved image 401B, by additionally using the immediately preceding scaled interleaved image 404'.

Subsequently, the content reproduction application 202 generates a scaled left-eye interleaved image 403A and a scaled right-eye interleaved image 403B by scaling the interpolated left-eye image 402A and interpolated right-eye image 402B. For example, the content reproduction application 202 generates a left-eye image 403A and a right-eye image 403B, in which the numbers of pixels in the horizontal and vertical directions in the interpolated left-eye image 402A and interpolated right-eye image 402B are doubled. In other words, the content reproduction application 202 generates the left-eye image 403A and right-eye image 403B, in which the numbers of scanning lines in the interpolated left-eye image 402A and interpolated right-eye image 402B are doubled.

The content reproduction application 202 generates a scaled left-eye interleaved image 404A and a scaled right-eye interleaved image 404B by interleaving once again the scaled left-eye image 403A and scaled right-eye image 403B. The content reproduction application 202 disposes, for example, the pixels, which correspond to the odd-numbered scanning lines of the interpolated left-eye image 402A, in the odd-numbered scanning lines of the left-eye interleaved image 404A, and disposes the pixels, in which no image is rendered, in the even-numbered scanning lines of the left-eye interleaved image 404A. In addition, the content reproduction application 202 disposes, for example, the pixels, which correspond to the even-numbered scanning lines of the interpolated right-eye image 402B, in the even-numbered scanning lines of the right-eye interleaved image 404B, and disposes the pixels, in which no image is rendered, in the odd-numbered scanning lines of the right-eye interleaved image 404B. As described above, after the left-eye interleaved image 401A and right-eye interleaved image 401B are interpolated, the resultant images are subjected to the scaling and re-interleaving, and thereby the interleaved image 401 can smoothly be scaled. The LCD 17 displays an interleaved image 404 in which the left-eye interleaved image 404A and right-eye interleaved image 404B are integrated. In other words, the content reproduction application 202 displays on the LCD 17 the interleaved image 404 in which, for example, the odd-numbered scanning lines of the left-eye interleaved image 404A and the even-numbered scanning lines of the right-eye interleaved image 404B are alternately disposed.

In the meantime, as described above, the content reproduction application 202 may display an image for a time-division method on the LCD 17. In this case, the content reproduction application 202 alternately displays the interpolated and scaled left-eye image 403A and right-eye image 403B on the LCD 17. For example, by using liquid crystal shutter glasses, the user can view the left-eye image 403A by the left eye and the right-eye image 403B by the right eye. Thus, the content reproduction application 202 displays the left-eye image 403A and right-eye image 403B alternately (at high speed) on the LCD 17, and the shutter in front of the user's left eye and the shutter in front of the user's right eye are opened/closed in synchronized with the display of images, and thereby the user can perceive the video displayed on the screen as stereoscopic video.

Figure 9:
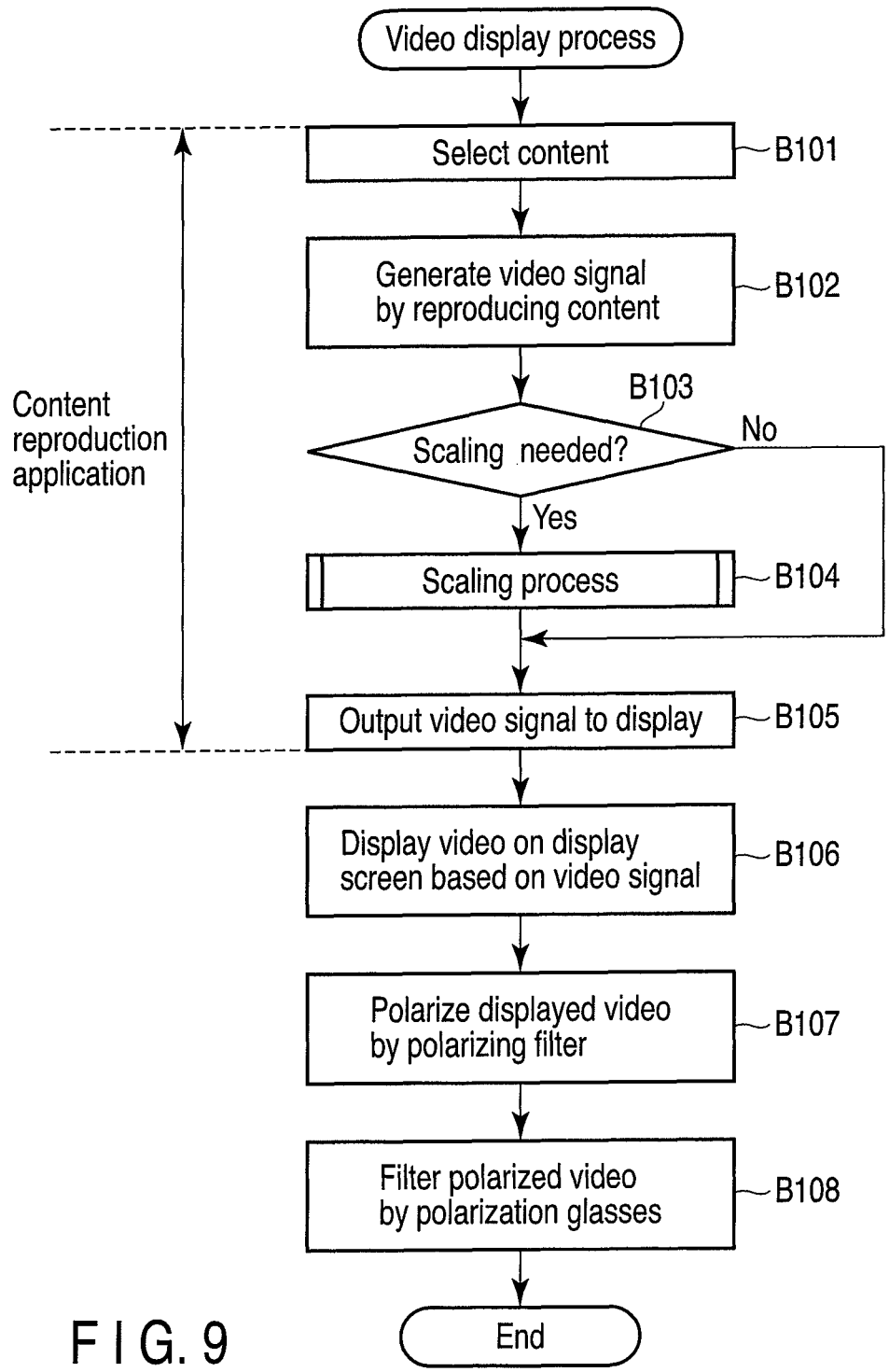
FIG. 9 is an exemplary flowchart illustrating an example of the procedure of a video display process executed by the video processing apparatus of the embodiment.

Next, referring to a flowchart of FIG. 9, a description is given of an example of the procedure of a video display process which is executed by the video processing apparatus 10.

To start with, the content reproduction application 202 selects 3D video content data 501 that is a target of reproduction (block B101). The 3D video content data 501 that is the target of reproduction is designated by the user by using, e.g. a GUI. The content reproduction application 202 generates a video signal of video which is to be displayed on the LCD 17 by reproducing the 3D video content data 501 that is the target of reproduction (block B102).

Then, the content reproduction application 202 determines whether the generated video signal needs to be subjected to a scaling process (block B103). For example, when the resolution of the generated video signal is different from the size (resolution) of the window on which the video signal (3D video content data 501) is to be displayed, the content reproduction application program 202 determines that the generated video signal needs to be subjected to the scaling process.

When the generated video signal needs to be subjected to the scaling process (YES in block B103), the content reproduction application program 202 executes the scaling process on the video signal (block B104). The details of the procedure of the scaling process will be described later with reference to FIG. 10.

After the video signal is subjected to the scaling process or if the generated video signal does not need to be subjected to the scaling process (NO in block B103), the content reproduction application program 202 outputs the generated video signal to the LCD 17 (block B105).

Subsequently, the LCD 17 displays video based on the input video signal (block B106). When the video content data that is the target of reproduction is video content data for displaying 3D video, the pixels of a left-eye image are displayed, for example, on odd-numbered scanning lines, and the pixels of a right-eye image are displayed on even-numbered scanning lines.

The polarizing filter 19 polarizes the video that is displayed on the LCD 17 (block B107). For example, the polarizing filter 19 polarizes, in a first direction, the image which corresponds to the odd-numbered scanning lines, and polarizes, in a second direction, the image which corresponds to the even-numbered scanning lines. In other words, the polarizing filter 19 polarizes the left-eye image by the left-eye filter 19A, and polarizes the right-eye image by the right-eye filter 19B.

The polarization glasses 31 pass the polarized left-eye image by the left-eye filter 31A and pass the polarized right-eye image by the right-eye filter 31B (block B108). The user views the polarized images by using the polarization glasses 31, thus being able to capture the left-eye image by the left eye and the right-eye image by the right eye. Thus, when the video content data that is the target of reproduction is video content data for displaying 3D video, the user can view 3D video by wearing the polarization glasses 31 and viewing the polarized images. Besides, the user can view 3D video which is scaled in accordance with the size of the window.

Next, referring to FIG. 10, a description is given of an example of the procedure of a scaling process by the content reproduction application 202. The content reproduction application 202 successively applies a scaling process to interleaved images (frames) included in a video signal which is generated based on the 3D video content data 501.

To start with, the content reproduction application 202 extracts a left-eye interleaved image 401A and a right-eye interleaved image 401B from the interleaved image 401 (block B201). For example, the content reproduction application 202 extracts the left-eye interleaved image 401A, which corresponds to the odd-numbered scanning lines in the interleaved image 401, and the right-eye interleaved image 401B, which corresponds to the even-numbered scanning lines in the interleaved image 401.

Then, the content reproduction application 202 generates a first 3D model by using the left-eye interleaved image 401A (block B202). The content reproduction application 202 generates the first 3D model corresponding to the left-eye interleaved image 401A, for example, by using a technique of estimating the depth of each of the pixels in the image. Similarly, the content reproduction application 202 generates a second 3D model by using the right-eye interleaved image 401B (block B203). The content reproduction application 202 generates the second 3D model corresponding to the right-eye interleaved image 401B, for example, by using a technique of estimating the depth of each of the pixels in the image. The content reproduction application 202 then generates a 3D model in which the first 3D model and second 3D model are integrated in consideration of binocular parallax (block B204).

Subsequently, the content reproduction application 202 determines whether the interleaved image 401 that is the target of processing is a first frame of the video signal (3D video content data 501) (block B205). If the interleaved image 401 that is the target of processing is not the first frame of the video signal (NO in block B205), the content reproduction application 202 interpolates missing parts due to interleaving in the left-eye interleaved image 401A and right-eye interleaved image 401B, by using the 3D model which is created in block B204 and an interleaved image 404' which immediately precedes the interleaved image 401 that is the target of processing (block B206). The content reproduction application 202 generates an interpolated left-eye image 402A and an interpolated right-eye image 402B, by using the 3D model which is created in block B204 and the interleaved image 404' which immediately precedes the interleaved image 401 that is the target of processing. On the other hand, if the interleaved image 401 that is the target of processing is the first frame of the video signal (YES in block B205), the content reproduction application 202 interpolates the left-eye interleaved image 401A and right-eye interleaved image 401B, by using the 3D model generated in block B204 (block B207). The content reproduction application 202 generates the interpolated left-eye image 402A and interpolated right-eye image 402B, by using the 3D model generated in block B204.

The content reproduction application 202 scales the interpolated left-eye image 402A and interpolated right-eye image 402B, which are generated in block B206 or block B207, from a first resolution to a second resolution (block B208). The content reproduction application 202 generates a left-eye scaling image 403A and a right-eye scaling image 403B by scaling the interpolated left-eye image 402A and interpolated right-eye image 402B from the first resolution to the second resolution. Then, using the left-eye scaling image 403A and right-eye scaling image 403B, the content reproduction application 202 generates interleaved images 404A and 404B (block B209).

Subsequently, the content reproduction application 202 determines whether there is a frame following the interleaved image 401 that is the target of processing (block B210). If there is a frame following the interleaved image 401 (YES in block B210), the content reproduction application 202 sets the next frame to be the interleaved image 401 that is the target of processing (block B211). The content reproduction application 202 subjects the interleaved image 401, which is the newly set target of processing, to the process beginning from block B201. If there is no frame following the interleaved image 401 (NO in block B210), the content reproduction application 202 completes the scaling process.

By the above-described process, the content reproduction application 202 can convert the interleaved image 401 at the first resolution to the interleaved image 404 at the second resolution which is higher than the first resolution by smoothly scaling up the interleaved image 401. Thus, by reproducing the 3D video content data 501 by the content reproduction application 202, the user can view smooth 3D video with an arbitrary resolution.

As has been described above, according to the present embodiment, the 3D video data, in which the left-eye image and right-eye image are interleaved, can smoothly be scaled. The content reproduction application 202 extracts the left-eye interleaved image 401A and right-eye interleaved image 401B from the interleaved image 401, and interpolates the missing parts due to interleaving in the left-eye interleaved image 401A and right-eye interleaved image 401B. Then, the content reproduction application 202 generates the smoothly scaled interleaved image 404 by scaling the interpolated left-eye image 402A and interpolated right-eye image 402B from the first resolution to the second resolution, and re-interleaving the resultant images. By viewing the interleaved image 404 displayed on the LCD 17 with use of the polarization glasses 19, the user can perceive stereoscopic video.

In the meantime, the content reproduction application 202 may alternately display on the LCD 17 the left-eye image 403A and right-eye image 403B which are interpolated and scaled from the first resolution to the second resolution. In this case, using liquid crystal shutter glasses which are synchronized with the display timing of images on the LCD 17, the user can perceive stereoscopic video.

All the procedures of the scaling process according to the present embodiment may be executed by software. Thus, the same advantageous effects as with the present embodiment can easily be obtained simply by installing a program, which executes the procedures of the scaling process, into an ordinary computer through a computer-readable storage medium.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video processing apparatus configured to scale three-dimensional video data from a first resolution to a second resolution, the three-dimensional video data comprising an interleaved image of a left-eye image and a right-eye image alternately disposed in scan lines, the apparatus comprising:
   an image extraction module configured to extract a left-eye interleaved image corresponding to scan lines of the left-eye image and a right-eye interleaved image corresponding to scan lines of the right-eye image;
   an image interpolation module configured to generate an interpolated left-eye image and an interpolated right-eye image by interpolating pixels missing from the disposition of the left-eye image and the right-eye image in alternate scan lines, by using the left-eye interleaved image and the right-eye interleaved image; and
   a scaling module configured to generate a left-eye scaling image and a right-eye scaling image by scaling the interpolated left-eye image and the interpolated right-eye image to the second resolution,
   wherein the image interpolation module is configured to generate a first three-dimensional model by using the left-eye interleaved image, to generate a second three-dimensional model by using the right-eye interleaved image, to generate a three-dimensional model wherein the first three-dimensional model and the second three-dimensional model are integrated, and to interpolate the left-eye interleaved image and the right-eye interleaved image by using the three-dimensional model.

2. The video processing apparatus of claim 1, wherein the image interpolation module is configured to interpolate the left-eye interleaved image and the right-eye interleaved image by using an immediately preceding scaled interleaved image corresponding to an interleaved image immediately preceding the interleaved image being processed in the three-dimensional video data.

3. The video processing apparatus of claim 2, wherein the image interpolation module is configured to generate a first three-dimensional model by using the left-eye interleaved image, to generate a second three-dimensional model by using the right-eye interleaved image, to generate a three-dimensional model wherein the first three-dimensional model and the second three-dimensional model are integrated, and to interpolate the left-eye interleaved image and the right-eye interleaved image by using the three-dimensional model and the immediately preceding scaled interleaved image.

4. The video processing apparatus of claim 1, further comprising an interleaved image generator configured to generate a scaled interleaved image by alternately disposing the left-eye scaling image and the right-eye scaling image in every other scan line.

5. A video processing method of scaling three-dimensional video data from a first resolution to a second resolution, the three-dimensional video data comprising an interleaved image of a first resolution, wherein a left-eye image and a right-eye image are alternately disposed in scan lines, the method comprising:
   extracting a left-eye interleaved image corresponding to scan lines of the left-eye image and a right-eye interleaved image corresponding to scan lines of the right-eye image;
   generating an interpolated left-eye image and an interpolated right-eye image by interpolating pixels missing from the disposition of the left-eye image and the right-eye image in alternate scan lines, by using the left-eye interleaved image and the right-eye interleaved image; and generating a left-eye scaling image and a right-eye scaling image by scaling the interpolated left-eye image and the interpolated right-eye image to the second resolution, wherein the generating the interpolated left-eye image and the interpolated right-eye image comprises generating a first three-dimensional model by using the left-eye interleaved image, generating a second three-dimensional model by using the right-eye interleaved image, generating a three-dimensional model wherein the first three-dimensional model and the second three-dimensional model are integrated, and interpolating the left-eye interleaved image and the right-eye interleaved image by using the three-dimensional model.

6. The video processing method of claim 5, wherein the generating the interpolated left-eye image and the interpolated right-eye image comprises interpolating the left-eye interleaved image and the right-eye interleaved image by using an immediately preceding scaled interleaved image corresponding to an interleaved image immediately preceding the interleaved image being processed in the three-dimensional video data.

7. The video processing method of claim 6, wherein the generating the interpolated left-eye image and the interpolated right-eye image further comprises generating a first three-dimensional model by using the left-eye interleaved image, generating a second three-dimensional model by using the right-eye interleaved image, generating a three-dimensional model wherein the first three-dimensional model and the second three-dimensional model are integrated, and interpolating the left-eye interleaved image and the right-eye interleaved image by using the three-dimensional model and the immediately preceding scaled interleaved image.

8. The video processing method of claim 7, further comprising generating a scaled interleaved image by alternately disposing the left-eye scaling image and the right-eye scaling image in every other scan line.

* * * * *